United States Patent
Liu et al.

(10) Patent No.: US 10,518,618 B2
(45) Date of Patent: Dec. 31, 2019

(54) TARP MOTOR ASSEMBLY

(71) Applicant: Dumore Corporation, Mauston, WI (US)

(72) Inventors: Bukun Liu, Wisconsin Dells, WI (US); James Muchenberger, Mauston, WI (US); David Messer, Lyndon Station, WI (US)

(73) Assignee: Dumore Corporation, Mauston, WI (US)

( * ) Notice: Subject to any disclaimer, the term of this patent is extended or adjusted under 35 U.S.C. 154(b) by 307 days.

(21) Appl. No.: 15/362,282

(22) Filed: Nov. 28, 2016

(65) Prior Publication Data

US 2018/0147923 A1    May 31, 2018

(51) Int. Cl.
| | | |
|---|---|---|
| *B60J 7/08* | (2006.01) | |
| *F16H 37/04* | (2006.01) | |
| *F16H 1/16* | (2006.01) | |
| *F16H 1/20* | (2006.01) | |

(52) U.S. Cl.
CPC ............ *B60J 7/085* (2013.01); *F16H 37/041* (2013.01); *F16H 1/16* (2013.01); *F16H 1/20* (2013.01)

(58) Field of Classification Search
CPC ............ H02K 7/1166; Y10T 74/19828; Y10T 74/18792; F16H 1/16; F16H 1/203; B60R 11/0235; B60R 1/074; B60J 7/085; E05Y 2900/55

See application file for complete search history.

(56) References Cited

U.S. PATENT DOCUMENTS

| | | | | |
|---|---|---|---|---|
| 3,815,289 | A * | 6/1974 | Hoffman | B24B 9/16 451/279 |
| 4,529,098 | A * | 7/1985 | Heider | B60J 7/085 220/211 |
| 5,031,955 | A * | 7/1991 | Searfoss | B60J 7/085 296/100.14 |
| 5,076,338 | A | 12/1991 | Schmeichel et al. | |
| 5,174,353 | A | 12/1992 | Schmeichel et al. | |
| 5,482,347 | A | 1/1996 | Clarys et al. | |
| 5,823,067 | A | 10/1998 | Clarys et al. | |
| 5,829,819 | A * | 11/1998 | Searfoss | B60J 7/085 296/98 |
| 5,887,937 | A * | 3/1999 | Searfoss | B60J 7/085 296/122 |
| 6,322,041 | B1 | 11/2001 | Schmeichel | |
| 6,871,969 | B2 * | 3/2005 | Yamauchi | B60R 1/074 359/841 |

(Continued)

FOREIGN PATENT DOCUMENTS

| | | |
|---|---|---|
| CA | 2034907 | 2/1996 |
| CA | 2266821 | 7/2005 |
| CA | 2233742 | 3/2007 |

OTHER PUBLICATIONS

Superwinch Power Drive Manual, Nov. 8, 2013, 9 pages.

*Primary Examiner* — Kiran B Patel
(74) *Attorney, Agent, or Firm* — Quarles & Brady LLP

(57) ABSTRACT

Disclosed herein is a tarp motor assembly for a truck bed that utilizes both a worm drive, comprising a worm gear and a worm screw which is arranged directly on a motor-driven armature shaft of an electric motor, and a spur gear transmission, which is driven by the worm drive and connected to an output shaft, to control spooling of a tarp over the truck bed.

21 Claims, 4 Drawing Sheets

(56) References Cited

U.S. PATENT DOCUMENTS

| | | | |
|---|---|---|---|
| 6,990,873 B2 * | 1/2006 | Rennen | F02D 9/1065 |
| | | | 185/11 |
| 7,008,000 B1 | 3/2006 | Schmeichel | |
| 7,048,277 B1 | 5/2006 | Schmeichel | |
| 7,066,524 B2 | 6/2006 | Schmeichel et al. | |
| 8,226,150 B1 | 7/2012 | Schmeichel et al. | |
| 8,439,423 B2 | 5/2013 | Schmeichel et al. | |
| 8,496,283 B1 | 7/2013 | Schmeichel et al. | |
| 8,534,742 B2 | 9/2013 | Schmeichel et al. | |
| 8,608,224 B2 | 12/2013 | Searfoss | |
| 8,857,885 B2 | 10/2014 | Schmeichel et al. | |
| 9,039,065 B2 | 5/2015 | Schmeichel et al. | |
| 9,254,776 B2 | 2/2016 | Schmeichel et al. | |
| 9,260,139 B2 | 2/2016 | Schmeichel | |
| 9,272,610 B2 | 3/2016 | Schmeichel et al. | |
| 9,393,854 B2 | 7/2016 | Schmeichel et al. | |
| 10,328,777 B2 * | 6/2019 | Searfoss | B60J 7/104 |
| 2001/0027146 A1 * | 10/2001 | Spaziani | F16H 37/065 |
| | | | 477/3 |
| 2005/0035623 A1 * | 2/2005 | Martinson | B60J 7/062 |
| | | | 296/100.13 |
| 2012/0181812 A1 * | 7/2012 | Searfoss | B60J 7/085 |
| | | | 296/98 |
| 2013/0036936 A1 * | 2/2013 | Searfoss | B60J 7/085 |
| | | | 105/377.02 |
| 2013/0204461 A1 * | 8/2013 | Kartes | B60J 7/068 |
| | | | 701/2 |
| 2013/0328345 A1 * | 12/2013 | Barley | B60J 7/085 |
| | | | 296/98 |
| 2016/0115725 A1 * | 4/2016 | Yulkowski | E05F 15/603 |
| | | | 49/70 |
| 2016/0229329 A1 | 8/2016 | Schmeichel et al. | |
| 2018/0087334 A1 * | 3/2018 | Bouligny | E21B 19/164 |
| 2019/0217691 A1 * | 7/2019 | Eggers | B60J 7/085 |

* cited by examiner

TARP MOTOR ASSEMBLY

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present disclosure relates to tarp motor assemblies for controlling the spooling of tarps, such as those found on trucks or other vehicles to protect against external elements and to maintain the contents within the truck bed. In particular, the gear arrangements in tarp motor assemblies may be optimized in terms of specific gear types and ratios to be used for certain electric motors or tarp assemblies.

2. Description of the Related Art

Many utility trucks and other vehicles are equipped with open top truck beds or trailers for easily loading and hauling cargo. For example, dump trucks can use an open bed or dump body to dump out the loads they carry by automatically raising the dump body with a hydraulic lift cylinder to a high angle and letting gravity carry the load out of the dump body past the open tailgate. Often, when hauling a load in an open bed, a tarpaulin or tarp is used to both protect the cargo from external elements and contain all of the loaded cargo within the open truck bed. Using a tarp is important for the safety of the driver, the cargo, as well as both people and property near and around the truck. Previously, tarps had to be manually secured to the open truck bed with hooks or cords, which cost time and increased the risk of improper attachment. Presently, many tarp systems utilize spooling systems including levers and poles with the tarp pre-attached and biased for a proper and efficient tarp deployment over the open truck bed. A number of spooling systems include a tarp motor for automatically spooling and unspooling the tarp using a controller on the side of the truck or located in the cab so that an operator can easily cover or uncover the open truck bed as desired.

U.S. Pat. No. 5,031,955 describes a truck cover that winds around a reel located at the front of the truck bed near the cab. The reel is driven by a motor through a worm drive, and the truck cover has legs biased with offset pivots for reducing the strain on the motor driving the reel. The biasing of the truck cover requires the direct-drive system to have automatic braking to ensure that the tarp does not unwind due to the spring bias when the motor is not driving the reel. A worm gear directly drives the reel and can function as an automatic brake due to its high reduction ratio. However, because the worm gear directly rotates the tarp spool, frictional losses reduce the efficiency of the reel drive system.

U.S. Pat. No. 5,829,819 describes an electric tarp system for a truck bed. In order to eliminate the frictional losses inherent in a direct-drive worm gear rotating a truck cover reel, this electric tarp system uses a spur gear transmission. In order to provide the automatic braking required to keep the biased truck cover from unwinding when the motor is not driving the reel, the electric tarp system uses a disc brake that is overcome when the motor is powered. However, as the electric tarp system is used, the disc brake will degrade from wear and have to be replaced.

From the foregoing, it can be appreciated that there is a need for alternative methods for spooling and unspooling a tarp with an electric motor that maintains a high efficiency with fewer frictional losses while eliminating degradation and required maintenance costs.

SUMMARY OF THE INVENTION

Disclosed herein is a tarp motor assembly for a truck bed that utilizes both a worm drive, comprising a worm gear and a worm screw, which is arranged directly on a motor-driven armature shaft of an electric motor, and a spur gear transmission, which is driven by the worm drive and connected to an output shaft to control spooling of a tarp over the truck bed.

In one aspect, the present disclosure provides a tarp motor assembly comprising an electric motor, a worm drive, and a spur gear transmission. The electric motor drives an armature shaft. The worm drive includes a worm screw connected to the armature shaft and a worm gear. The spur gear transmission is connected to an output shaft and includes a plurality of parallel shafts and a plurality of spur gears. The worm gear is arranged along with one of the plurality of spur gears on one of the plurality of parallel shafts.

In another aspect, the present disclosure provides an electric motor assembly comprising an electric motor that drives a worm screw, a worm gear driven by the worm screw, and a spur gear transmission connected to an output shaft. The spur gear transmission includes a plurality of parallel shafts and a plurality of spur gears. The worm gear is connected to one of the plurality of parallel shafts such that when the worm screw is driven by the electric motor, the worm gear drives the spur gear transmission, which in turn rotates the output shaft.

In yet another aspect, the present disclosure provides a spooling gear assembly for an electric motor comprising a spool connected to a spur gear transmission, a worm gear connected to the spur gear transmission, and a worm screw that drives the worm gear. The spur gear transmission includes a plurality of parallel shafts and a plurality of spur gears. The worm screw is attachable to the electric motor such that the electric motor may rotate the worm screw.

In some embodiments, the assemblies further comprise a tarp connected to the output shaft or spool. In some embodiments, the worm screw has a plurality of threads. In some embodiments, the assemblies have a total gear reduction ratio between about 200:1 and about 800:1. In some embodiments, the worm screw and the worm gear have a gear reduction ratio between about 10:1 and about 40:1. In some embodiments, the spur gear transmission has a gear reduction ratio between about 10:1 and about 150:1. In some embodiments, the worm screw, the worm gear, and the spur gear transmission have a total efficiency between about 60% and about 98%.

These and other features, aspects, and advantages of the present invention will become better understood upon consideration of the following detailed description, drawings, and appended claims.

DETAILED DESCRIPTION OF THE INVENTION

The present disclosure provides an optimized tarp motor assembly utilizing both a worm drive and a spur gear transmission. The worm drive provides a holding effect for the tarp such that the tarp will not unspool while the motor is not driving the spool. Additionally, the worm drive is arranged at the first stage such that the frictional losses are minimal and the spur gear transmission provides a greater efficiency to the overall system compared to a direct-drive worm gear rotating the tarp spool.

Figure 1:
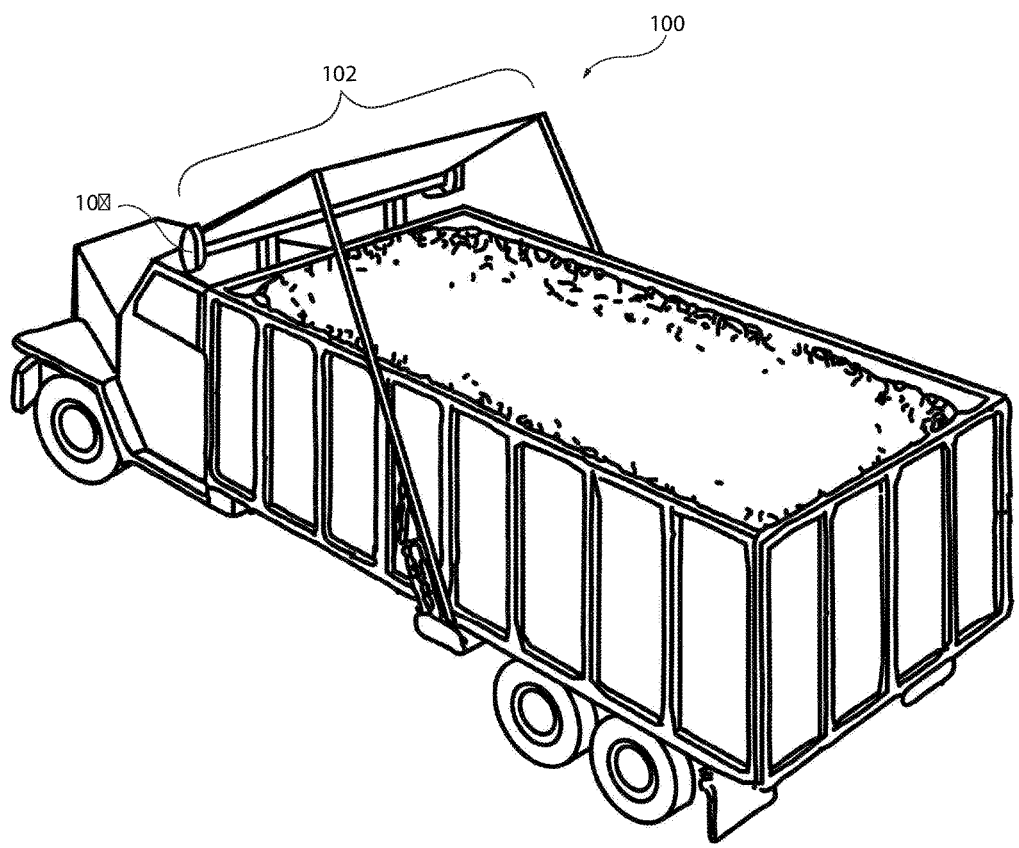
FIG. 1 is an example of a truck with a tarp system for an open truck bed known in the prior art.

FIG. 1 shows a dump truck with a tarp assembly 100 installed for covering the open bed known in the prior art. As explained in the description of the related art above, both safety and best practices dictate that tarpaulins or tarps should be used to cover loads carried in open truck beds. The tarp assembly 100 includes a tarp 102 that can be stretched over the open truck bed and a tarp spool 104 that stores the tarp 102 in place when not in use and acts as the anchor for the tarp 102 at one end of the truck bed. The tarp 102 can be attached to structures that are biased to stretch the tarp over the open truck bed. In this case, the tarp spool 104 can be attached to a spooling system that both holds the tarp 102 in a spooled state, resisting the attached bias to unspool and stretch out over the open truck bed, and controls the re-spooling of the tarp 102 onto the tarp spool 104 and uncovering the open truck bed. In some cases, the spooling system can include an electric motor, such as those systems described in U.S. Pat. Nos. 5,031,955 and 5,829,819.

As an alternative to the configuration shown in FIG. 1, the tarp spool 104 need not be anchored at one end of the truck bed and can instead be attached directly to the biasing structures such that the tarp spool 104 itself moves across the truck bed during spooling and unspooling operations. Additionally, the tarp 102 may unspool in any direction over the open truck bed including left to right or front to back, for example. Further, the configuration of the tarp assembly 100 is not limited to an open truck bed and can also be applied to other similar open bed or open top structures such as a tractor trailer, for example.

Figure 2:
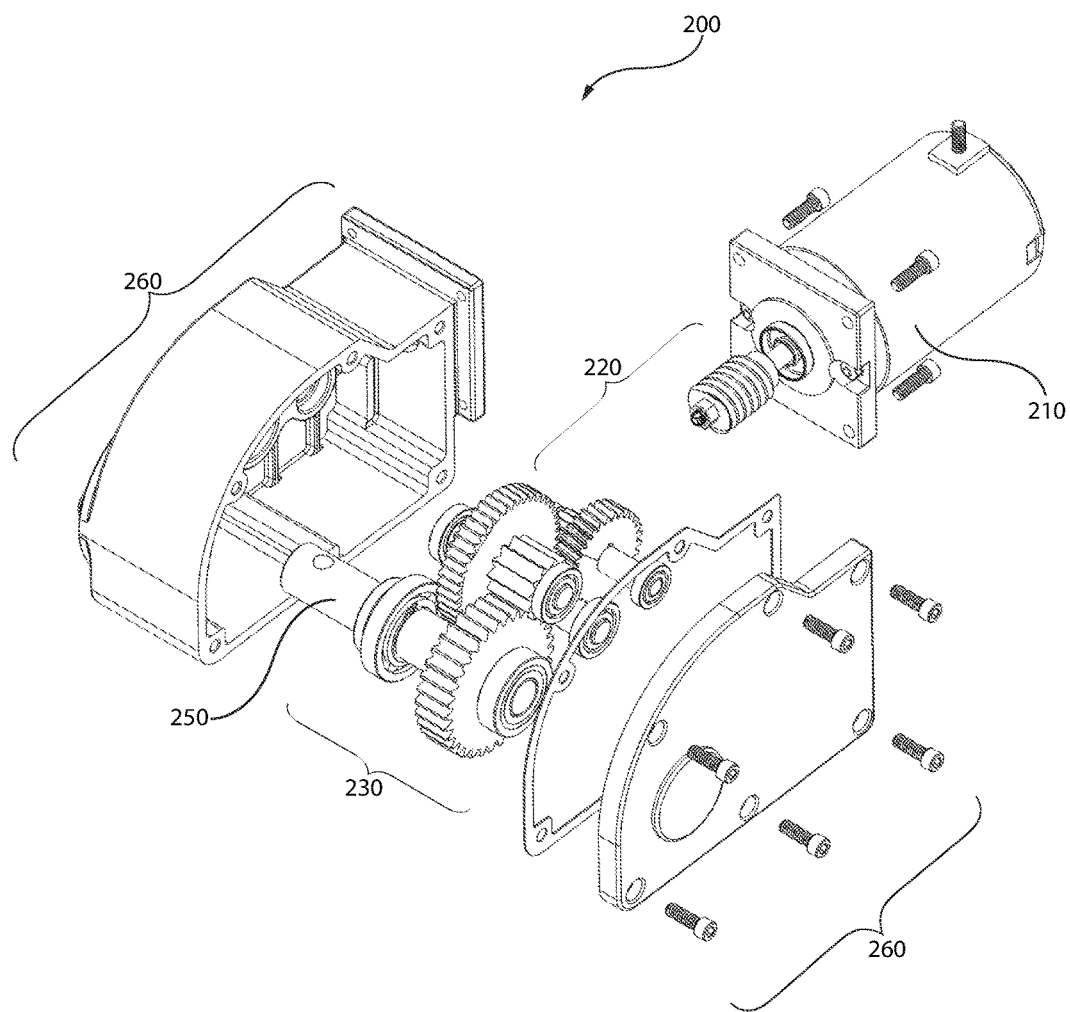
FIG. 2 is an exploded isometric view of a tarp motor assembly, in accordance with the present disclosure.

FIG. 2 shows an exploded isometric view of an example tarp motor assembly 200 that controls the spooling or unspooling of a tarp for covering an open truck bed. The tarp may be similar to the one shown in FIG. 1 or may vary in dimensions, material, finishing, and/or connections with the truck. The tarp motor assembly 200 includes an electric motor 210, a worm drive 220, and a spur gear transmission 230. The electric motor 210 drives the worm drive 220 which in turn drives the spur gear transmission 230. The spur gear transmission 230 is connected to an output shaft 250, which can connect with a tarp spool for spooling and unspooling the tarp. The output shaft 250 may connect to the tarp spool with a bushing, cross hole, keyway, spline, or any other known connection types.

Figure 3:
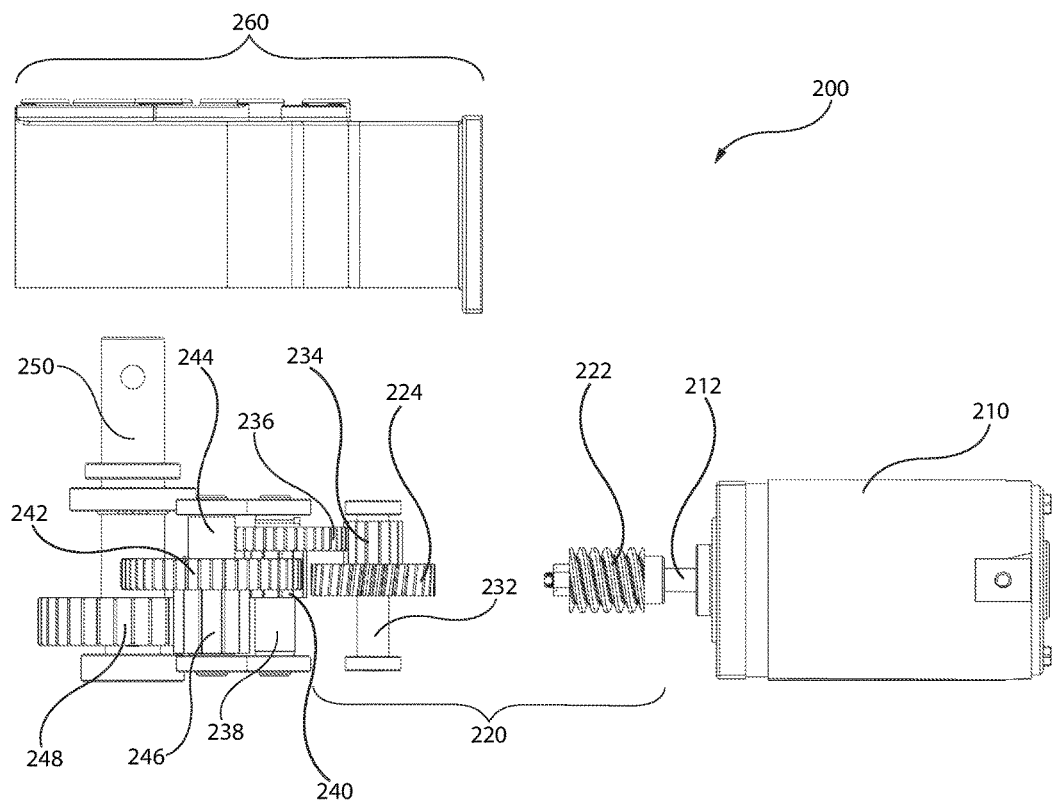
FIG. 3 is an exploded top view of the tarp motor assembly of FIG. 2, in accordance with the present disclosure.

In particular, as seen in FIG. 3, the electric motor 210 drives an armature shaft 212. The armature shaft 212 is connected to a worm screw 222 such that as the electric motor 210 drives the armature shaft 212, the armature shaft 212 rotates the worm screw 222. The electric motor 210 may rotate the armature shaft 212 in either direction to rotate the worm screw 222 both clockwise and counter-clockwise. The worm screw 222 includes one or more threads that mesh with teeth on a worm gear 224. The worm gear 224 is rotated by the worm screw 222 since the threads on the worm screw 222 push the meshing teeth of the worm gear 224 using friction as the worm screw 222 rotates the spiraling threads, which act as ramps contacting the teeth of the worm gear 224. The worm gear 224 is arranged on a parallel shaft 232 such that when the worm gear 224 is rotated the parallel shaft rotates. The combination of the worm screw 222 and the worm gear 224 constitutes the worm drive 220 of the tarp motor assembly 200.

The worm drive 220 advantageously provides a holding effect to the tarp motor assembly 200, eliminating any need for a separate brake, such as spring biased friction discs used in previous parallel shaft systems. This holding effect of the worm drive 220 is due to the increased reduction ratio, surface contact area, and friction between the threads of the worm screw 222 and the teeth of the worm gear 224. This holding effect prevents any reversal in the flow of power or back driving. Back driving occurs when the output drives the input, rather than the input (motor 210) driving the output (output shaft 250). Preventing back driving is important in tarp motor assemblies so that the tarp only spools and unspools when driven to by the motor 210. Brakes used in previous parallel shaft systems fail due to wear, corrosion, or contaminates. Eliminating the need for a separate brake thus makes the present tarp motor assembly 200 more reliable through replacing a component prone to failure.

The worm drive 220 may be used to modulate the angular velocity outputs of smaller electric motors that operate optimally at higher speeds. Small electric motors are generally high-speed with low torque, but the combination with a worm drive 220 allows a small electric motor in just one stage to decrease the speed output and increase torque while remaining compact in size. The electric motor 210 may be a 4-pole motor with a 12V DC input. The electric motor 210 may be powered by any DC power source including a battery, for example. The electric motor 210 may have an intermittent duty and supply up to about 0.75-1 HP.

The arrangement of the worm drive 220 directly at the motor-driven armature shaft 212 of the electric motor 210 optimizes the space-saving of the tarp motor assembly 200. The addition of the worm drive 220 to the tarp motor assembly 200 converts the previous parallel shaft system into a combination system including a right-angle shaft gear set directly driven by the input motor 210 at the first stage followed by a parallel shaft spur gear transmission 230 connected to the output shaft for spooling the tarp over the truck bed. This means that the electric motor 210 no longer has to be parallel with the output shaft 250 for spooling the tarp and can instead be arranged more covertly and compactly off to the side of the tarp motor assembly 200. Finally, use of the worm drive 220 allows for a large amount of reduction within a relatively small space, especially compared to the space required for a helical gear providing the same amount of reduction, for example.

Figure 4:
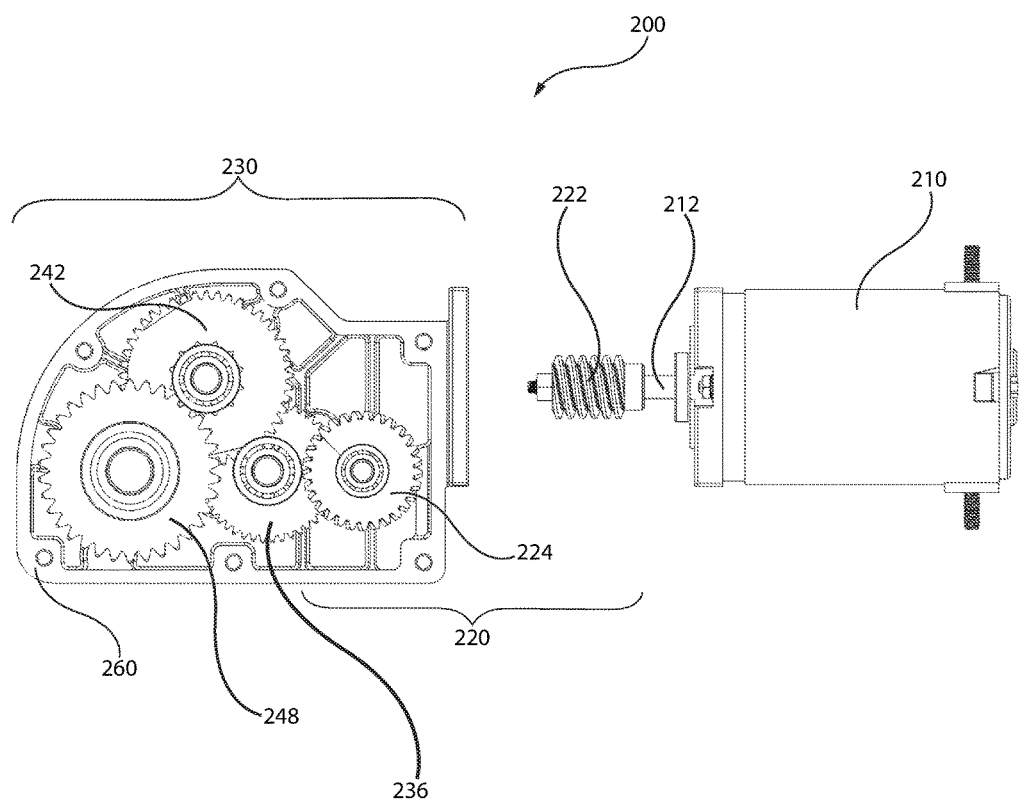
FIG. 4 is an exploded side view of the tarp motor assembly of FIG. 2, in accordance with the present disclosure.

As seen in FIGS. 3-4, the parallel shaft 232 on which the worm gear 224 is arranged also includes a spur gear 234 arranged on the parallel shaft 232 such that when the parallel shaft 232 is rotated by the worm gear 224, the spur gear 234 is caused to rotate by the parallel shaft 232. The teeth of the spur gear 234 mesh with the teeth of a second spur gear 236 such that when the spur gear 234 is caused to rotate, the second spur gear 236 is caused to rotate by the spur gear 234.

The second spur gear 236 is arranged on a second parallel shaft 238 such that when the second spur gear 236 is caused to rotate, the second parallel shaft 238 is caused to rotate by the second spur gear 236. The second parallel shaft 238 on which the second spur gear 236 is arranged also includes a third spur gear 240 arranged on the second parallel shaft 238 such that when the second parallel shaft 238 is rotated by the second spur gear 236, the third spur gear 240 is caused to rotate by the second parallel shaft 238. The teeth of the third spur gear 240 mesh with the teeth of a fourth spur gear 242 such that when the third spur gear 240 is caused to rotate, the fourth spur gear 242 is caused to rotate by the third spur gear 240. The fourth spur gear 242 is arranged on a third parallel shaft 244 such that when the fourth spur gear 242 is caused to rotate, the third parallel shaft 244 is caused to rotate by the fourth spur gear 242. The third parallel shaft 244 on which the fourth spur gear 242 is arranged also includes a fifth spur gear 246 arranged on the third parallel shaft 244 such that when the third parallel shaft 244 is rotated by the fourth spur gear 242, the fifth spur gear 246 is caused to rotate by the third parallel shaft 244. The teeth of the fifth spur gear 246 mesh with the teeth of a sixth spur gear 248 such that when the fifth spur gear 246 is caused to rotate, the sixth spur gear 248 is caused to rotate by the fifth spur gear 246. The sixth spur gear 248 is arranged on the output shaft 250 such that when the sixth spur gear 248 is caused to rotate, the output shaft 250 is caused to rotate by the sixth spur gear 248. The combination of the spur gears 234, 236, 240, 242, 246, 248 and the parallel shafts 232, 238, 244 constitutes the spur gear transmission 230 of the tarp motor assembly 200. The number of spur gears and parallel shafts in the spur gear transmission may vary. For example, there may be less than four parallel shafts.

The connection between the worm drive 220 and the spur gear transmission 230 is facilitated by arranging the worm gear 224 on the same shaft as the spur gear 234 at the first stage of the spur gear transmission, which is the second stage overall for the tarp motor assembly 200. This overlap between the worm drive 220 and the spur gear transmission 230 saves space as well. Since the worm gear 224 and first-stage spur gear 234 are fixed on the same shaft, they will have the same angular velocity and torque.

The tarp motor assembly 200 may further include a housing 260 for covering and/or protecting the spur gear transmission 230 and/or the worm drive 220. The housing 260 may be made from multiple parts, which fasten together and seal off the worm drive 220 and spur gear transmission 230 from external elements. The housing 260 may provide an opening through which the output shaft 250 extends in order to connect with the tarp spool. Additionally, the housing 260 may provide an opening through which the armature shaft 212 extends in order to allow the threads of the worm screw 222 to engage or mesh with the teeth of the worm gear 224. The housing 260 may include multiple gaskets or other compressible components that fit against any of the openings in the housing 260 in order to form a good seal, which does not interfere with the rotation of the output shaft 250 and/or the armature shaft 212. Internally, the housing 260 can include brackets and/or detents formed into the sides for properly positioning and/or securing the parallel shafts 232, 238, 244 with respect to each other within the housing 260. The electric motor 210 may include its own generally cylindrical housing so the electric motor 210 may be arranged outside of the housing 260. This arrangement of the electric motor 210 outside the housing 260 allows for the electric motor 210 to be easily swapped out or replaced without having to dismantle the entire tarp motor assembly 200. The electric motor 210 may further include a mounting bracket with fasteners that fits up against a portion of the housing 260 such that the fasteners may secure the electric motor 210 to the housing 260 and position the worm drive 220 and the spur gear transmission 230 in their proper locations. Since precise positioning of gears is required to optimize the efficiency and minimize the wear of any gear train, providing the housing 260 with an exact, detailed structure, tailored specifically to the particular tarp motor assembly 200, as well as strong, durable fasteners for minimizing vibration and/or displacement advantageously enhances the operation of the tarp motor assembly 200.

For all gears, the gear reduction or velocity ratio is the rotational speed of the driven gear over the rotational speed of the driving gear, which can be calculated by their respective number of teeth. The gear reduction ratio of the worm drive 220 is the number of teeth on the worm gear 224 divided by the number of threads on the worm screw 222. Here, as seen in FIGS. 2-4, the worm screw 222 has two threads or starts and the worm gear 224 has 29 teeth, so the gear ratio is 29:2 or 14.5:1. Therefore, the worm screw 222 rotates 14.5 times to rotate the worm gear 224 one time. The addition of threads or starts on the worm screw 222 reduces the ratio since multiple threads move the worm gear 224 more in one rotation of the worm screw 222. The number of teeth on the worm gear 224 and the number of threads on the worm screw 222 may vary. For example, the worm screw 222 may have only one thread or a single start. In the most preferred configurations, the worm drive 220 has a gear reduction ratio falling within the range of about 10:1 to about 40:1.

For spur gears arranged on parallel shafts, the gear reduction ratio is the product of the number of teeth on the driven gears divided by the product of the number of teeth on the driving gears. As shown in FIGS. 2-4, there are six spur gears 234, 236, 240, 242, 246, 248 across four parallel shafts 232, 238, 244, 250 in the spur gear transmission 230. Here, there are three spur gears 234, 240, 246 driving, with 16, 13, and 12 teeth, respectively, and three spur gears 236, 242, 248 being driven, with 45, 45, and 34 teeth, respectively. Thus, the ratio is (45×45×34)/(16×13×12)=27.6. It will be understood that the number of teeth on the spur gears may vary in accordance with the designs of different assemblies. To find the total gear reduction ratio of the assembly 200, simply multiply the ratios together at each stage. Here, the gear ratio for the entire system is 14.5×27.6=400. In the most preferred configurations, the gear reduction ratio for the spur gear transmission 230 falls within the range of about 10:1 to about 150:1. The total gear reduction ratio for the assembly 200 may fall within the range of about 200:1 to about 400:1 for a worm screw 222 with 2 threads or starts and within the range of about 400:1 to about 800:1 for worm screws 222 with a single start.

The spur gears may be made from steel. The worm gear may be bronze. Additionally, the gears may be case hardened with a ferritic nitrocarburizing process such as a MELONITE® treatment, for example.

The location of the worm drive 220 at the very first stage of gearing increases the overall efficiency of the tarp motor assembly 200. In order to use a small electric motor 210 for the tarp motor assembly 200, there is preferably be a torque increase across both the worm drive 220 and the spur gear transmission 230. A reduction ratio of approximately 60:1 across the entire tarp motor assembly 200 should be sufficient for these purposes. The minimum reduction ratio of the worm drive 220 combined with the spur gear transmission 230 is preferably around 30:1 in order for the assembly 200 to produce the holding effect as desired. With these minimum design constraints in mind, the overall efficiency and space-saving for the tarp motor assembly 200 can be optimized through varying the gear specifications. For example, minimizing the center distance from the worm gear shaft 232 to the output shaft 250 will minimize the overall size of the tarp motor assembly 200.

Since the final-stage spur gear of the spur gear transmission is larger than the first-stage spur gear due to the increase in teeth, placing the worm gear on the smaller shaft of the first-stage spur gear causes the corresponding worm screw and the worm drive overall to take up as little room as possible. In this way the surface contact area of the worm drive 220 is minimized, and therefore the frictional losses are minimized. Thus, the placement of the worm drive 220 at the first stage, upstream of the spur gear transmission 230 will minimize frictional losses and maximize efficiency.

The increased reduction ratio, surface contact area, and friction between the worm screw 222 and worm gear 224 in the worm drive 220 decreases the efficiency of the power transmission from the input motor 210 to the spur gear transmission 230. The loss of efficiency is from power losses due to tooth friction losses dissipated as heat and oil churning losses absorbed by the lubricants applied to the worm drive 220 as an oil film boundary layer. Because these power losses are inherent to the worm drive 220, it is best that the worm drive 220 is arranged at the first stage of power transmission so that the surface contact area is minimized. With the worm drive 220 located at the first stage just a small amount of friction across the worm drive 220 will prevent the entire tarp motor assembly 200 from back driving because that small amount of friction is amplified through the gear set.

The foregoing has shown that the combination of a worm drive and a spur gear transmission in a tarp motor assembly advantageously provides a holding effect while maintaining a higher efficiency than an assembly with a worm drive alone. Further, the use of a worm drive and its holding effect may help resolve wear and replacement issues that exist in assemblies with separate brakes. The tarp motor assemblies detailed above represent a new type of optimized spooling system not previously described. The tarp motor assemblies may be integrated into the trailer or truck bed when originally manufactured. Alternatively, the tarp motor assemblies may be provided as aftermarket add-ons to replace other tarp motors and/or convert the hand crank spooling assemblies into automated motorized spooling assemblies.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:
1. A tarp motor assembly comprising:
  an electric motor driving an armature shaft;
  a worm drive including a worm screw connected to the armature shaft and a worm gear; and
  a spur gear transmission connected to an output shaft, wherein the spur gear transmission includes a plurality of parallel shafts and a plurality of spur gears, and wherein the worm gear is arranged along with one of the plurality of spur gears on one of the plurality of parallel shafts.

2. The tarp motor assembly of claim 1, further comprising a tarp connected to the output shaft.

3. The tarp motor assembly of claim 1, wherein the worm screw has a plurality of threads.

4. The tarp motor assembly of claim 1, wherein the worm drive and the spur gear transmission have a total gear reduction ratio between about 200:1 and about 800:1.

5. The tarp motor assembly of claim 1, wherein the worm drive has a gear reduction ratio between about 10:1 and about 40:1.

6. The tarp motor assembly of claim 1, wherein the spur gear transmission has a gear reduction ratio between about 10:1 and 150:1.

7. The tarp motor assembly of claim 1, wherein the worm drive and the spur gear transmission have a total efficiency between about 60% and about 98%.

8. An electric motor assembly comprising:
  an electric motor that drives a worm screw;
  a worm gear driven by the worm screw; and
  a spur gear transmission, connected to an output shaft, wherein the spur gear transmission includes a plurality of parallel shafts and a plurality of spur gears, and wherein the worm gear is connected to one of the plurality of parallel shafts.

9. The electric motor assembly of claim 8, further comprising a tarp connected to the output shaft.

10. The electric motor assembly of claim 8, wherein the worm screw has a plurality of threads.

11. The electric motor assembly of claim 8, wherein the worm screw, the worm gear, and the spur gear transmission have a total gear reduction ratio between about 200:1 and about 800:1.

12. The electric motor assembly of claim 8, wherein the worm screw and the worm gear have a gear reduction ratio between about 10:1 and about 40:1.

13. The electric motor assembly of claim 8, wherein the spur gear transmission has a gear reduction ratio between about 10:1 and 150:1.

14. The electric motor assembly of claim 8, wherein the worm screw, the worm gear, and the spur gear transmission have a total efficiency between about 60% and about 98%.

15. A spooling gear assembly for an electric motor comprising:
  a spool connected to a spur gear transmission, wherein the spur gear transmission includes a plurality of parallel shafts and a plurality of spur gears;
  a worm gear connected to the spur gear transmission; and
  a worm screw that drives the worm gear, wherein the worm screw is attachable to the electric motor such that the electric motor may rotate the worm screw.

16. The spooling gear assembly of claim 15, further comprising a tarp connected to the spool.

17. The spooling gear assembly of claim 15, wherein the worm screw has a plurality of threads.

18. The spooling gear assembly of claim 15, wherein the worm screw, the worm gear, and the spur gear transmission have a total gear reduction ratio between about 200:1 and about 800:1.

19. The spooling gear assembly of claim 15, wherein the worm screw and the worm gear have a gear reduction ratio between about 10:1 and about 40:1.

20. The spooling gear assembly of claim 15, wherein the spur gear transmission has a gear reduction ratio between about 10:1 and 150:1.

21. The spooling gear assembly of claim 15, wherein the worm screw, the worm gear, and the spur gear transmission have a total efficiency between about 60% and about 98%.

\* \* \* \* \*